(12) United States Patent
Roper (10) Patent No.: US 8,639,494 B1
(45) Date of Patent: Jan. 28, 2014

(54) TECHNIQUE FOR CORRECTING USER-INTERFACE SHIFT ERRORS

(75) Inventor: Colin J. Roper, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 249 days.

(21) Appl. No.: 12/979,975

(22) Filed: Dec. 28, 2010

(51) Int. Cl.
*G06F 17/27* (2006.01)
*G01C 9/00* (2006.01)
*G06F 17/20* (2006.01)

(52) U.S. Cl.
USPC .................. 704/9; 702/150; 715/257

(58) Field of Classification Search
USPC ............................................................ 704/9
See application file for complete search history.

(56) References Cited

U.S. PATENT DOCUMENTS

| | | | | | |
|---|---|---|---|---|---|
| 5,442,373 | A * | 8/1995 | Nomura et al. | ............... | 345/104 |
| 7,289,956 | B2 * | 10/2007 | Yu et al. | ......................... | 704/240 |
| 7,506,252 | B2 * | 3/2009 | Blumberg | ..................... | 715/256 |
| 7,584,093 | B2 * | 9/2009 | Potter et al. | ....................... | 704/9 |
| RE40,993 | E * | 11/2009 | Westerman | ................... | 345/173 |
| 7,668,723 | B2 * | 2/2010 | Fejzo | ............................. | 704/500 |
| 7,758,264 | B2 * | 7/2010 | Jawerth et al. | ................ | 400/489 |
| 2003/0036879 | A1 * | 2/2003 | Sagar | ............................. | 702/150 |
| 2003/0069882 | A1 * | 4/2003 | Nieswand et al. | ................ | 707/5 |
| 2004/0102971 | A1 * | 5/2004 | Lipscher et al. | .............. | 704/236 |
| 2008/0155398 | A1 * | 6/2008 | Bodin et al. | ................... | 715/257 |
| 2009/0228277 | A1 * | 9/2009 | Bonforte et al. | ............. | 704/246 |
| 2011/0205182 | A1 * | 8/2011 | Miyazawa et al. | ............ | 345/174 |
| 2011/0246575 | A1 * | 10/2011 | Murayama et al. | ............ | 709/204 |
| 2012/0102002 | A1 * | 4/2012 | Sathyanarayana et al. | ... | 707/687 |
| 2012/0127071 | A1 * | 5/2012 | Jitkoff et al. | .................. | 345/156 |

* cited by examiner

*Primary Examiner* — David R Hudspeth
*Assistant Examiner* — Timothy Nguyen
(74) *Attorney, Agent, or Firm* — Park, Vaughan, Fleming & Dowler LLP; Steven E. Stupp (57) ABSTRACT

The disclosed embodiments relate to a system that corrects user-interface shift errors. During operation of the system, a user provides an input through a user interface. In response, the system compares the input to a pre-determined set of phrases associated with user-interface errors. In particular, the user-interface errors may include shift errors in a position of a finger or a hand of the user relative to the user interface. Based on the comparisons, the system identifies a correct input, thereby facilitating correction of the shift error that occurred when the user provided the input through the user interface. Next, the system provides feedback to the user. For example, the feedback may correct the received input or may provide a suggestion to the user that includes the suggested correct input.

21 Claims, 6 Drawing Sheets

TECHNIQUE FOR CORRECTING USER-INTERFACE SHIFT ERRORS

BACKGROUND

The present disclosure relates to techniques for correcting shift errors that arise when a user provides input through a user interface, where the shift error is caused by a shift in a position of a finger or a hand of the user relative to the user interface.

While alternative user interfaces (such as those based on voice recognition) are becoming increasingly popular, user interfaces that make use of a keyboard are still widely used. However, using a keyboard can be frustrating. For example, errors often occur when a user types in information. In some cases, spell checkers and other software tools can automatically correct such errors or suggest alternatives to a user.

Nonetheless, many information-entry errors, such as shift errors, are not addressed by existing spell checkers or related software tools. In these cases, the errors either go unnoticed (and, thus, uncorrected) or users are forced to retype the information. This additional effort is time consuming, and can reduce user satisfaction and the sales of products that include user interfaces with keyboards.

SUMMARY

The disclosed embodiments relate to a computer system that corrects a shift error. During operation, the computer system receives an input from a user of a user interface. Then, the computer system compares the input to a pre-determined set of phrases associated with user-interface errors, where the user-interface errors include shift errors in a position of a finger or a hand of the user relative to the user interface. Moreover, the computer system identifies a correct input based on the comparisons, thereby facilitating correction of the shift error that occurred when the user provided the input through the user interface. Next, the computer system provides feedback to the user.

Note that the user interface may include: a physical keyboard, a virtual keyboard, an alphanumeric user-input device and/or a number pad. Furthermore, key-pad positions in the user interface may have fixed locations and sizes.

Moreover, the shift error may be along a direction in a plane of the user interface (such as a horizontal or a vertical direction). Alternatively, the shift error may include components along two directions in a plane of the user interface (such as components along the horizontal and the vertical directions).

Furthermore, the set of phrases may include misspelled words associated with the shift errors. Note that, if the input includes a string corresponding to multiple words, comparing the multiple words and the set of phrases may facilitate identification of the correct input. If multiple correct input candidates are identified during the comparing operation, the computer system may weight the correct input candidates based on the magnitude of the shift error, thereby facilitating identification of the correct input.

In some embodiments, the shift error is associated with a position of either or both of the user's hands relative to the user interface. Additionally, the correct input may also be based on a history of user-specific shift errors.

Note that the feedback may include correcting the received input or providing a suggestion to the user that includes the correct input.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for correcting a shift error, and a computer-program product (e.g., software) for use with the computer system are described. During operation of the computer system, a user provides an input through a user interface. In response, the computer system compares the input to a pre-determined set of phrases associated with user-interface errors. In particular, the user-interface errors may include shift errors in a position of a finger or a hand of the user relative to the user interface. Based on the comparisons, the computer system identifies a correct input, thereby facilitating correction of the shift error that occurred when the user provided the input through the user interface. Next, the computer system provides feedback to the user. For example, the feedback may correct the received input or may provide a suggestion to the user that includes the correct input.

By facilitating correction of the shift error, this technique for correcting a shift error may reduce user errors when using the user interface. In turn, this may improve user productivity, as well as reduce user frustration when providing inputs, thereby enhancing the user experience, customer loyalty and the profitability and market share of the provider of the technique and/or products that use the technique.

In the discussion that follows, the user may include one of a variety of entities, such as: an individual (for example, an existing customer, a new customer, a service provider, an income-tax professional, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
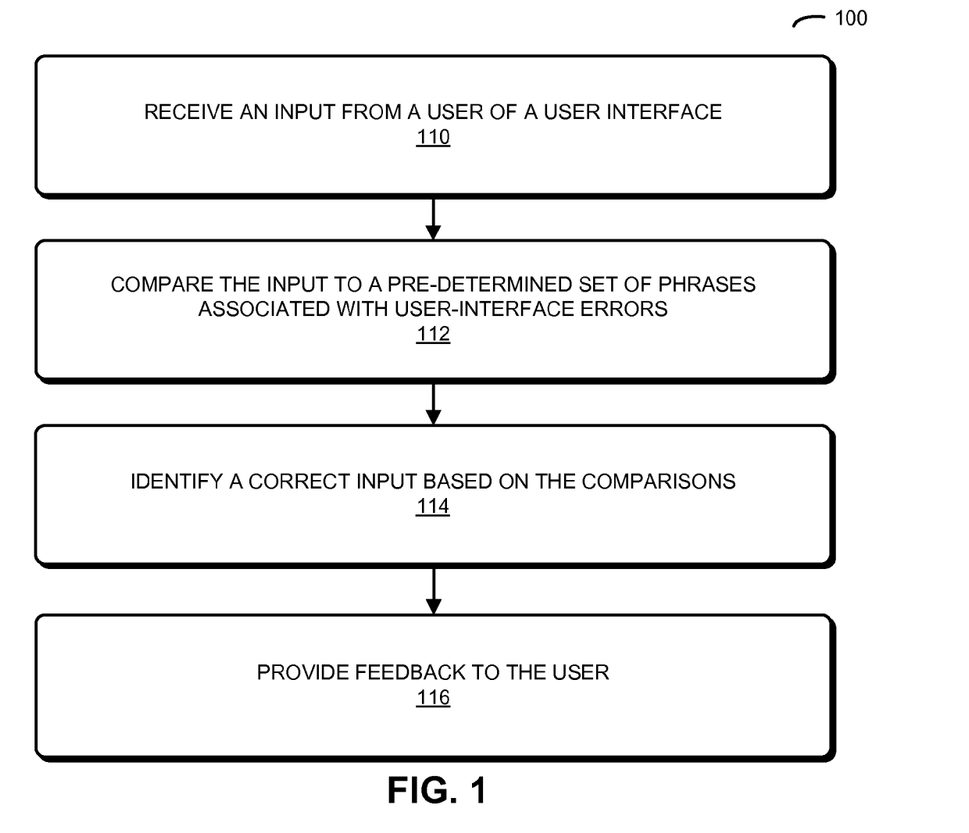
FIG. 1 is a flow chart illustrating a method for correcting a shift error in accordance with an embodiment of the present disclosure.

We now describe embodiments of a technique for correcting a shift error. FIG. 1 presents a flow chart illustrating a method 100 for correcting a shift error, which may be performed by a computer system (such as computer system 500 in FIG. 5). During operation, the computer system receives an input from a user of a user interface (operation 110). Note that the user interface may include: a physical keyboard, a virtual keyboard, an alphanumeric user-input device and/or a number pad. (More generally, the user interface may include any input device that requires a specific positioning of a finger and/or a hand relative to the input device.) Furthermore, keypad positions in the user interface may have fixed locations and sizes. Alternatively, the key-pad positions and/or sizes may be dynamically adapted or adjusted while the user is providing information, such as the input.

Then, the computer system compares the input to a predetermined set of phrases associated with user-interface errors (operation 112), where the user-interface errors include shift errors in a position of a finger of the user relative to the user interface. This set of phrases may include misspelled words associated with the shift errors. Furthermore, the shift error may be along a direction in a plane of the user interface (such as a horizontal or a vertical direction). Alternatively, the shift error may include components along two directions in a plane of the user interface (such as the horizontal and the vertical directions). In some embodiments, the shift error is associated with a position of either or both of the user's hands relative to the user interface.

Moreover, the computer system identifies a correct input based on the comparisons (operation 114), thereby facilitating correction of the shift error that occurred when the user provided the input through the user interface. In some embodiments, the correct input is further based on a history of user-specific shift errors. This may allow user behaviors, such as particular shift errors that occur often, to be used to identify the correct input. Furthermore, in some embodiments the correct input is identified based on context information, such as the syntax of a sentence or paragraph that includes the input. For example, grammatical or lexicography rules associated with a language may be applied to assist in identifying the correct input.

Next, the computer system provides feedback to the user (operation 116). For example, the feedback may include correcting the received input and/or providing a suggestion to the user that includes the correct input.

Note that, if the input includes a string corresponding to multiple words, comparing the multiple words and the set of phrases may facilitate identification of the correct input. For example, Levenshtein distances (and, more generally, error metrics) may be computed between each of the phrases and the sequence of characters in the string, and the correct input may be identified using the Levenshtein distance or the error metric for at least one of the phrases.

Additionally, if multiple correct input candidates are identified during the comparing operation, the computer system may weight the correct input candidates based on the magnitude of the shift error, thereby facilitating identification of the correct input. For example, a candidate associated with a smaller shift error (i.e., a shorter spatial displacement relative to the keys or icons in the user interface) may have a higher weight than a candidate that is associated with a larger shift error.

Figure 2:
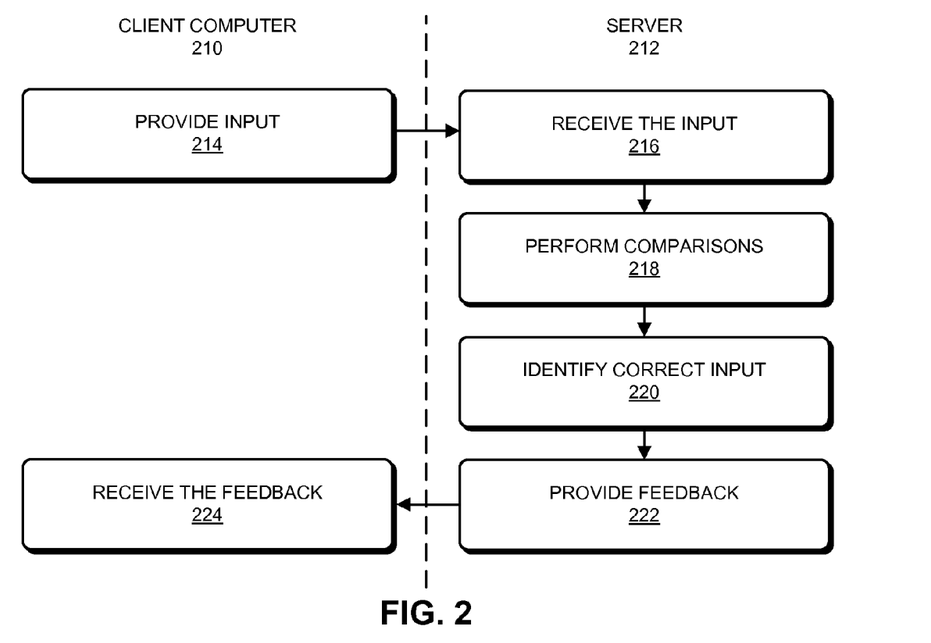
FIG. 2 is a flow chart illustrating the method of FIG. 1 in accordance with an embodiment of the present disclosure.

In an exemplary embodiment, the technique for correcting a shift error is implemented using one or more client computers and at least one server computer, which communicate through a network, such as the Internet (i.e., using a client-server architecture). This is illustrated in FIG. 2, which presents a flow chart illustrating method 100. During this method, a user of client computer 210 provides the input using the user interface (operation 214).

After the input is received by server 212 (operation 216), server 212 compares the input to the pre-determined set of phrases associated with user-interface errors (operation 218), and server 212 identifies the correct input based on the comparisons (operation 220). Then, server 212 provides the feedback to the user (operation 222), which is received by client computer 210 (operation 224).

In some embodiments of method 100 (FIGS. 1 and 2), there may be additional or fewer operations. Moreover, the order of the operations may be changed, and/or two or more operations may be combined into a single operation.

We now describe embodiments of the shift errors that can occur when a user provides an input using a user interface. In general, there are a variety of reasons that users make mistakes when inputting information using a user interface that includes a keyboard. For example, in some cases, a user doesn't know how to correctly spell the word (which can be addressed using a spell checker). In other cases, the user's left and right hands aren't quite synchronized when activating keys or icons on a keyboard, and characters are entered or typed in the wrong order. However, in some embodiments, the user enters or types the correct word(s), but their finger(s) or their hand(s) are not in the correct position(s) relative to the user interface (which is referred to as a 'shift error' in this discussion).

Figure 3:
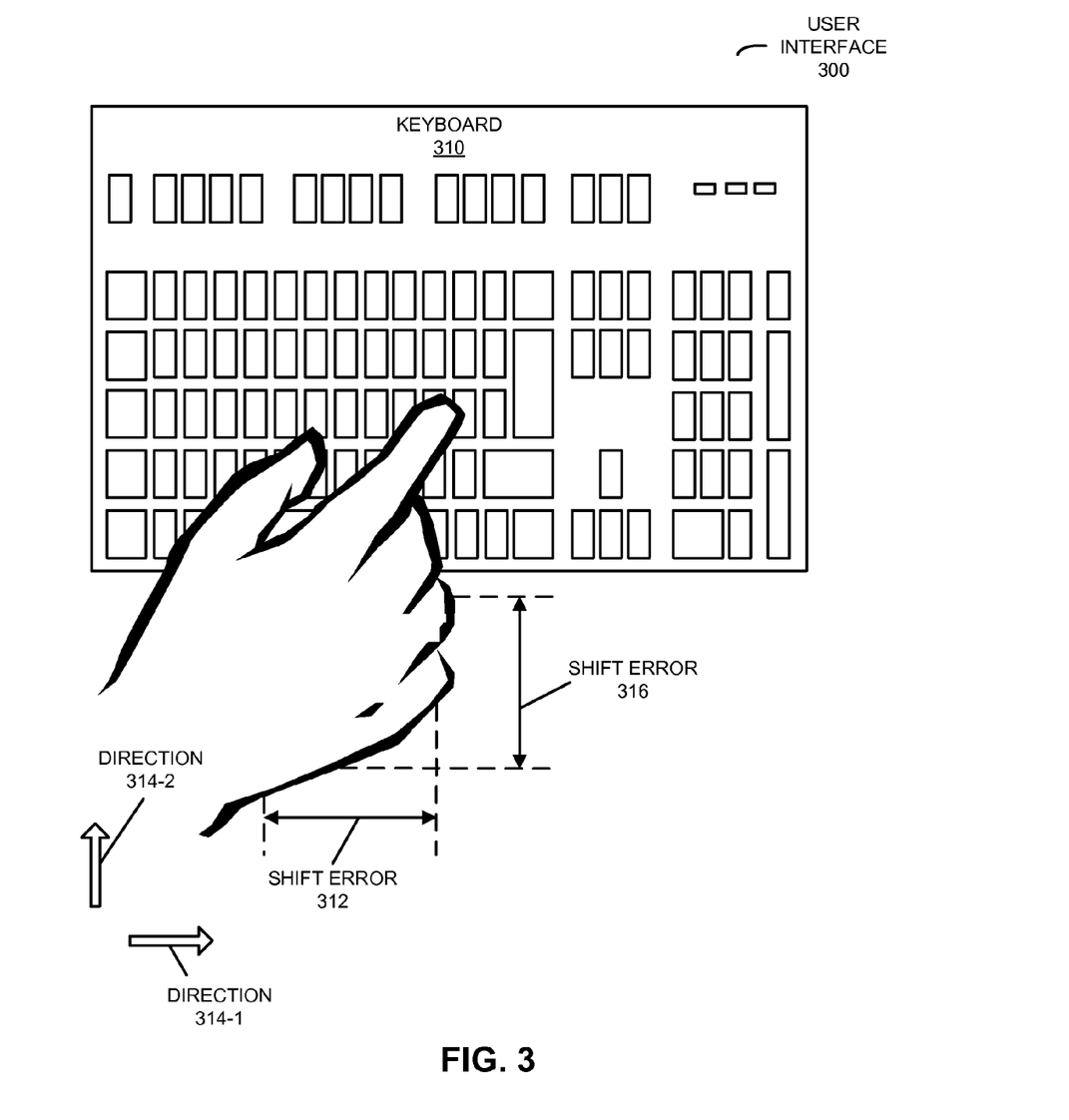
FIG. 3 is a block diagram illustrating a user interface in accordance with an embodiment of the present disclosure.

Shift errors are illustrated in FIG. 3, which presents a block diagram illustrating a user interface 300 that includes a keyboard 310. In particular, a shift error 312 may be along a direction 314-1 in a plane of user interface 300 (such as a horizontal or a vertical direction). Alternatively, a shift error 316 may include components along two directions 314 in the plane of user interface 300 (such as the horizontal and the vertical directions). In an exemplary embodiment, shift errors 312 and/or 316 include errors associated with a spatial shift relative to keyboard 310 of up to two keys or icons (up, down, left and/or right).

Note that such shift errors may occur because a user placed their hands on user interface 300 and started typing, but they didn't place their hands on the correct keys or icons on keyboard 310. For example, if a user's left hand is correctly placed on keyboard 310 but the user's right hand is accidentally shifted one key to the right, and the user tries to type or enter "alphabet," the input will be "a;[jabet".

Using the technique for correcting the shift error, the relationship between the keys or icons on keyboard 310 (such as those in a QWERTY keyboard or a non-QWERTY keyboard) can be used to generate the pre-determined set of phrases associated with user-interface errors. For example, the pre-determined set of phrases may include all combinations of characters or symbols that could occur if one or more fingers or either hand were spatially shifted relative to keyboard 310 when the user enters an input.

Then, by comparing the input "a;[jabet" to the pre-determined set of phrases, the correct input, "alphabet," can be identified, and the shift error can either be corrected and/or a suggested alternative input to "a;[jabet" can be provided to the user. In some embodiments, if an exact match for the correct input is not identified, one or more nearest matches may be suggested to the user in the feedback.

Note that for the duration of an input session (such as when a user is typing information) during this process it may be assumed that the user's hand position(s) are unchanged (until the user re-orients their hand(s)). For example, if a user's right hand is shifted up by one key, with the first three words entered this shift may be determined with a high degree of confidence. In particular, when these three words were entered, it may be determined that there are 'no dictionary matches' with the inputs associated with the user's right hand. In response, shift-correcting analysis may be performed, as well as providing suggestions to the user and/or performing auto-correct. However, once there is a high enough level or degree of confidence, the inputs associated with the user's right hand may be translated or corrected to the 'determined' intended position so that the inputs associated with the user's right hand are correct (i.e., match the entries in a dictionary). This translation or correction would continue until another series of 'no dictionary matches' are detected when the user re-orients their hand(s). At this time, the preceding process may be repeated.

Furthermore, note that the capability in method 100 (FIGS. 1 and 2) is different from that in a spell checker, which can detect whether a word is misspelled based on common spelling errors, as opposed to the shift errors that can occur when the user's hands are misplaced relative to keyboard 310.

Figure 4:
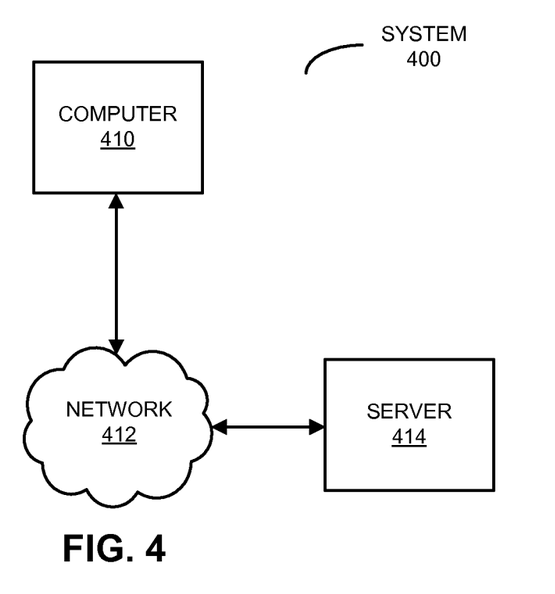
FIG. 4 is a block diagram illustrating a system that performs the method of FIGS. 1 and 2 in accordance with an embodiment of the present disclosure.

We now describe embodiments of the system and a computer system (which may be included in the system). FIG. 4 presents a block diagram illustrating a system 400 that performs method 100 (FIGS. 1 and 2). In this system, a user of computer 410 may use a physical interface or a virtual interface that is associated with a software product (which displays the user interface). For example, the user may interact with a web page that is provided by server 414 via network 412, and which is rendered by a web browser on computer 410. Alternatively, the user may use a software application that is resident on and that executes on computer 410. This software application may be a stand-alone application or a portion of another application that is resident on and which executes on computer 410 (such as software that is provided by server 414 or that is installed and which executes on computer 410).

In some embodiments, at least a portion of the software application may be an application tool (such as a software application tool) that is embedded in the web page (and which executes in a virtual environment of the web browser). Thus, the software application tool may be provided to the user via a client-server architecture.

As discussed previously, the user may provide an input using the user interface. This input may be analyzed by the software application (either on computer 410 and/or server 414). For example, the input may be provided to server 414 via network 412. Then, the input may be compared to the pre-determined set of phrases associated with user-interface errors. If the correct input is identified based on the comparisons, server 414 may provide the correct input to computer 410 via network 412, and this feedback may be used by computer 410. For example, the software application may replace the input with the correct input and/or may display the correct input on a display as a suggestion to the user. In some embodiments, some or all of these operations are performed on computer 410.

Note that the input, the pre-determined set of phrases and/or the correct input may be stored at one or more locations in system 400 (i.e., locally or remotely). Moreover, because this data may be sensitive in nature, it may be encrypted. For example, stored data and/or data communicated via network 412 may be encrypted.

Figure 5:
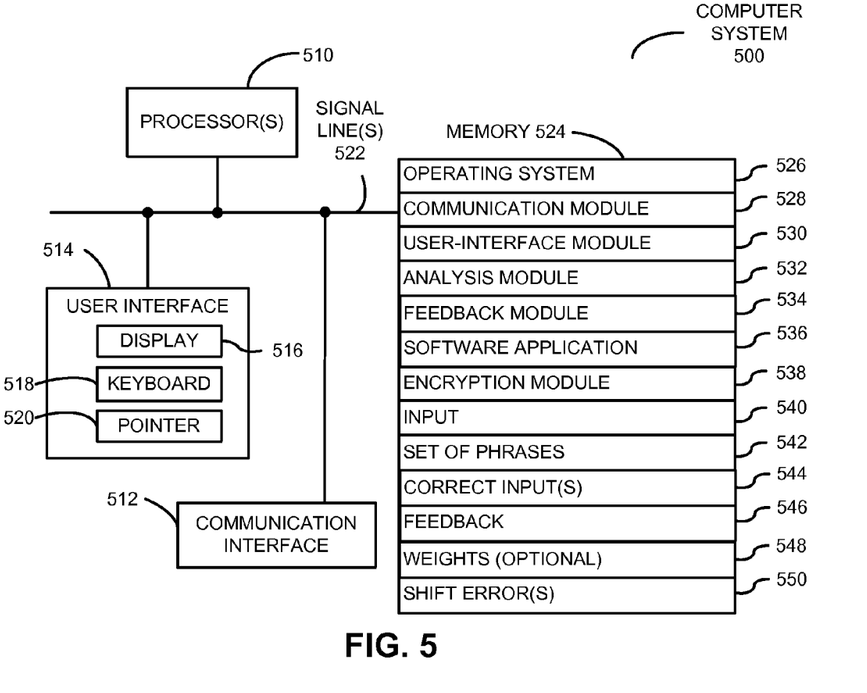
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 414 (FIG. 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smartcards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: user-interface module 530 (or a set of instructions), analysis module 532 (or a set of instructions), feedback module 534 (or a set of instructions), software application 536 (or a set of instructions), and/or encryption module 538 (or a set of instructions). Note that one or more of these program modules (or sets of instructions) may constitute a computer-program mechanism.

During method 100 (FIG. 1), a user may use a user interface 514, such as keyboard 518 or a virtual user interface that is displayed on display 516. (Note that display 516 may include a touch-sensitive display, a physical monitor and/or a virtual display in which information is projected onto another surface.) In particular, the user may provide an input 540 using user interface 514, which is received by user-interface module 530.

Figure 6:
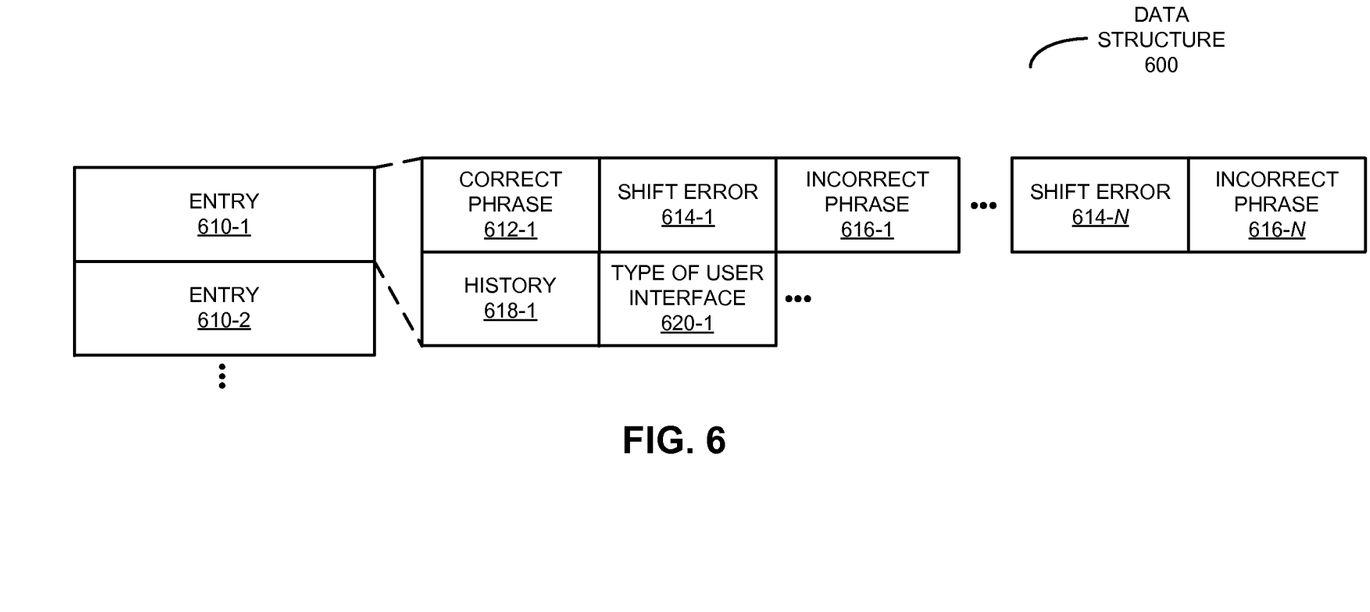
FIG. 6 is a block diagram illustrating a data structure for use in the computer system of FIG. 5 in accordance with an embodiment of the present disclosure.

Then, analysis module 532 may compare input 540 to pre-determined set of phrases 542, which is associated with user-interface errors. This pre-determined set of phrases may be stored in a data structure. This data structure is shown in FIG. 6, which presents a block diagram illustrating a data structure 600. In particular, data structure 600 may include entries 610. For example, entry 610-1 may include: a correct phrase 612-1, and multiple pairs of shift errors and associated incorrect phrases, such as shift error 614-1 and incorrect phrase 616-1. In addition, entry 610-1 may include a history 618-1 of user-specific shift errors and/or information about a type of user interface 620-1.

Referring back to FIG. 5, if analysis module 532 identifies correct input(s) 544 based on the comparisons, feedback module 534 may provide feedback 546. For example, feedback 546 may include replacing input 540 with one of correct input(s) 544 and/or may include providing a suggestion to the user via communication module 528. Note that in some embodiments, where there are multiple correct input(s) 544, the correct input is identified by analysis module 532 using optional weights 548 that are associated with shift errors 550.

Furthermore, because input 540 and/or correct input(s) 544 may be sensitive in nature, in some embodiments at least some of the data stored in memory 524 and/or at least some of the data communicated using communication module 528 is encrypted using encryption module 538.

Instructions in the various modules in memory 524 may be implemented in: a high-level procedural language, an object-oriented programming language, and/or an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Computers and servers in system 400 (FIG. 4) and/or computer system 500 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 412 (FIG. 4) may include: the Internet, World Wide Web (WWW), an intranet, LAN, WAN, MAN, or a combination of networks, or other technology enabling communication between computing systems.

In exemplary embodiments, user-interface module 530 and/or pre-determined set of phrases 542 may be associated with software application 536. For example, software application 536 may include a financial-software application (e.g., financial software), such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

User interface 300 (FIG. 3), system 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of system 400 (FIG. 4) and/or computer system 500 may be implemented more in hardware and less in software, or less in hardware and more in software, as is known in the art.

While the preceding discussion illustrated the use of the technique for correcting a shift error that encompassed all of the characters in a phrase or word, or a set of phrases or words, in some embodiments the shift error may only affect a subset of the characters in a phrase or a word. Furthermore, while the technique has been illustrated in the context of a user interface that includes a keyboard, it may be applied to a wide variety of user interfaces (including those that do not include a keyboard).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for correcting a shift error, comprising:
   receiving first input from a user of a user interface, wherein the user interface is a virtual keyboard, and wherein at least one of the user interface key-pad sizes is dynamically adapted while the user is providing the input;
   comparing, using a computer, the first input to a pre-determined set of phrases associated with user-interface errors, wherein the set of phrases includes misspelled words associated with the user-interface errors, and wherein the user-interface errors include shift errors in a position of a finger of the user relative to the user interface;
   determining, based on the comparing, one or more shift errors in the received first input;
   computing a degree of confidence for the determined shift errors; determining that the degree of confidence is greater than a threshold; in response to determining that the degree of confidence is greater than a threshold, identifying a correct input, thereby facilitating correction of the shift error that occurred when the user provided the first input through the user interface; and providing feedback to the user.

2. The method of claim 1, wherein key-pad positions in the user interface have fixed locations and sizes.

3. The method of claim 1, wherein the shift error is along a direction in a plane of the user interface.

4. The method of claim 1, wherein the shift error includes components along two directions in a plane of the user interface.

5. The method of claim 1, wherein the shift error is associated with a position of either or both of the user's hands relative to the user interface.

6. The method of claim 1, wherein the input includes a string corresponding to multiple words; and
   wherein comparing the multiple words and the set of phrases facilitates identification of the correct input.

7. The method of claim 1, wherein the correct input is further based on a history of user-specific shift errors.

8. The method of claim 1, wherein the feedback includes correcting the received input.

9. The method of claim 1, wherein the feedback includes providing a suggestion to the user that includes:

the correct input if an exact match for the correct input is identified; and one or more nearest matches if an exact match is not identified.

10. The method of claim 1, wherein, if multiple correct input candidates are identified during the comparing operation, the method further comprises weighting the correct input candidates based on the magnitude of the shift error, thereby facilitating identification of the correct input.

11. A non-transitory computer-program product for use in conjunction with a computer system, the computer-program product comprising a computer-readable storage medium and a computer-program mechanism embedded therein, to facilitate correction of a shift error, the computer-program mechanism including:

instructions for receiving an input from a user of a user interface, wherein the user interface is a virtual keyboard, and wherein at least one of the user interface key-pad sizes is dynamically adapted while the user is providing the input;

instructions for comparing the input to a pre-determined set of phrases associated with user-interface errors, wherein the set of phrases includes misspelled words associated with the user-interface errors, and wherein the user-interface errors include shift errors in a position of a finger of the user relative to the user interface;

instructions for determining, based on the comparing, one or more shift errors in the received input;

instructions for computing a degree of confidence for the determined shift errors;

instructions for determining that the degree of confidence is greater than a threshold;

instructions for identifying a correct input in response to determining that the degree of confidence is greater than a threshold, thereby facilitating correction of the shift error that occurred when the user provided the input through the user interface; and instructions for providing feedback to the user.

12. The computer-program product of claim 11, wherein the shift error is along a direction in a plane of the user interface.

13. The computer-program product of claim 11, wherein the shift error includes components along two directions in a plane of the user interface.

14. The computer-program product of claim 11, wherein the shift error is associated with a position of either or both of the user's hands relative to the user interface.

15. The computer-program product of claim 11, wherein the input includes a string corresponding to multiple words; and wherein comparing the multiple words and the set of phrases facilitates identification of the correct input.

16. The computer-program product of claim 11, wherein the correct input is further based on a history of user-specific shift errors.

17. The computer-program product of claim 11, wherein the feedback includes correcting the received input.

18. The computer-program product of claim 11, wherein the feedback includes providing a suggestion to the user that includes:

the correct input if an exact match for the correct input is identified; and one or more nearest matches if an exact match is not identified.

19. The computer-program product of claim 11, wherein, if multiple correct input candidates are identified during the comparing operation, the computer-program mechanism further includes weighting the correct input candidates based on the magnitude of the shift error, thereby facilitating identification of the correct input.

20. A computer system, comprising: a processor;

memory; and a program module, wherein the program module is stored in the memory and configurable to be executed by the processor to facilitate correction of a shift error, the program module including:

instructions for receiving an input from a user of a user interface, wherein the user interface is a virtual keyboard, and wherein at least one of the user interface key-pad sizes is dynamically adapted while the user is providing the input;

instructions for comparing the input to a pre-determined set of phrases associated with user-interface errors, wherein the set of phrases includes misspelled words associated with the user-interface errors, and wherein the user-interface errors include shift errors in a position of a finger of the user relative to the user interface;

instructions for determining, based on the comparing, one or more shift errors in the received input;

instructions for computing a degree of confidence for the determined shift errors;

instructions for determining that the degree of confidence is greater than a threshold;

instructions for identifying a correct input in response to determining that the degree of confidence is greater than a threshold, thereby facilitating correction of the shift error that occurred when the user provided the input through the user interface; and instructions for providing feedback to the user.

21. The method of claim 1 further comprises:

receiving a second input from the user of the user interface;

identifying a correct input based on the degree of confidence determined for the first input; and providing feedback to the user.

* * * * *